United States Patent [19]

Komatsubara et al.

[11] Patent Number: 4,527,756
[45] Date of Patent: Jul. 9, 1985

[54] CASSETTE TAPE MACHINE

[75] Inventors: Masahiro Komatsubara; Tetsuro Kamimura; Takugi Inanaga; Akira Takahashi, all of Kawagoe, Japan

[73] Assignee: Pioneer Electronic Corporation, Tokyo, Japan

[21] Appl. No.: 508,396

[22] Filed: Jun. 27, 1983

Related U.S. Application Data

[62] Division of Ser. No. 335,035, Dec. 28, 1981, Pat. No. 4,413,793.

[30] Foreign Application Priority Data

Dec. 26, 1980 [JP] Japan ................................ 55-186650
Dec. 29, 1980 [JP] Japan ................................ 55-187922

[51] Int. Cl.³ .................... G11B 15/24; G11B 15/32; B65H 49/02
[52] U.S. Cl. .................................... 242/68.3; 242/200
[58] Field of Search .............. 242/197, 198, 199, 200, 242/46.21, 46.6, 46.7, 68, 68.1, 68.2, 68.3

[56] References Cited

U.S. PATENT DOCUMENTS

| 2,620,140 | 12/1952 | Naegel ............................ 242/46.6 |
| 3,058,686 | 10/1962 | Field ............................... 242/68.3 |
| 4,021,856 | 5/1977 | Motoyama et al. ............ 242/199 X |
| 4,050,649 | 9/1977 | Haag ............................... 242/68 X |
| 4,413,793 | 11/1983 | Komatsubara et al. .............. 242/68 |

FOREIGN PATENT DOCUMENTS

732545  2/1943  Fed. Rep. of Germany ..... 242/46.6

Primary Examiner—Stuart S. Levy
Assistant Examiner—Lloyd D. Doigan
Attorney, Agent, or Firm—Sughrue, Mion, Zinn, Macpeak, and Seas

[57] ABSTRACT

The engagement between shaft hub and cassette reel is made resilient to dampen tape resonance. The hub projections can be either of a viscous elastic material, or a radially yieldable spring member.

2 Claims, 30 Drawing Figures

CASSETTE TAPE MACHINE

This is a division of application Ser. No. 335,035, filed Dec. 28, 1981, now U.S. Pat. No. 4,413,793, issued Nov. 8, 1983.

BACKGROUND OF THE INVENTION

The present invention relates to a cassette tape recorder for automatic stereo sets.

It is well known from experience that an ordinary cassette tape recorder may produce a high quality sound when a vehicle in which the cassette tape recorder is installed is in a stationary condition but that the same tape recorder may produce a poor quality sound when the vehicle is in motion and is experiencing large up-and-down vibrations. It is also known that, particularly when the remainder of tape to be played is large, wow is increased to thereby result in a poor quality sound production.

Figure 1:
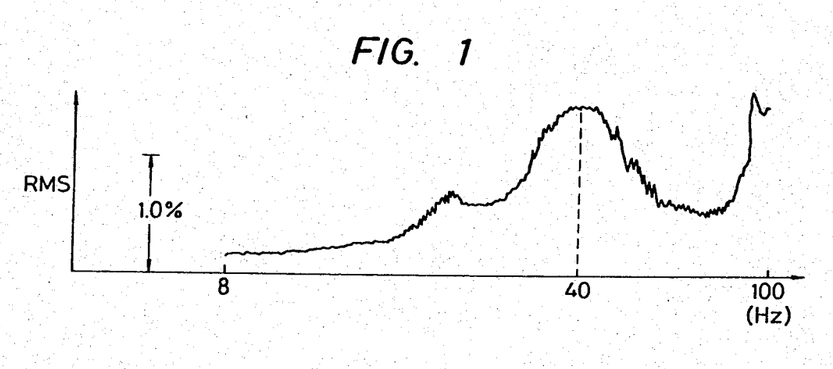
FIG. 1 is a graph showing the wow characteristics of a prior art cassette tape recorder, before auditory compensation.
Figure 2:
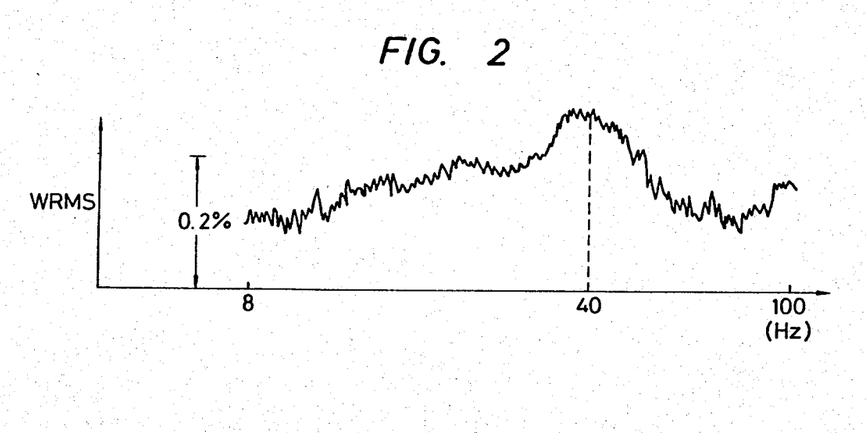
FIG. 2 is a graph showing the wow characteristics of the same cassette tape recorder as in FIG. 1, after auditory compensation.

Various studies of this wow phenomenon have been made by the present invention. In one experiment, an up-and-down vibration of 1G was applied to an ordinary cassette tape recorder at a changing frequency, and the resulting wow was measured. The results are shown in FIG. 1, which is a graph showing the wow (RMS) characteristics vs. frequency. As is apparent from the characteristic curve, wow exceeding 1% was generated at vibration of 40 Hz and also at 100 Hz or more. These characteristics were measured in another way, that is, in an auditory sense compensation, and the results were as shown in FIG. 2. The wow generated at the vibration of 100 Hz or more was less than 0.2% and caused no problem, but the wow generated at about 40 Hz was still more than 0.2%, which caused the quality of sound to be degraded.

Detailed analyses of the wow at 40 Hz were than made, which can be understood with reference to the structures of a conventional tape recorder and the tape cassette and operations thereof as will be explained in detail with reference to FIGS. 3 through 8.

Figure 3:
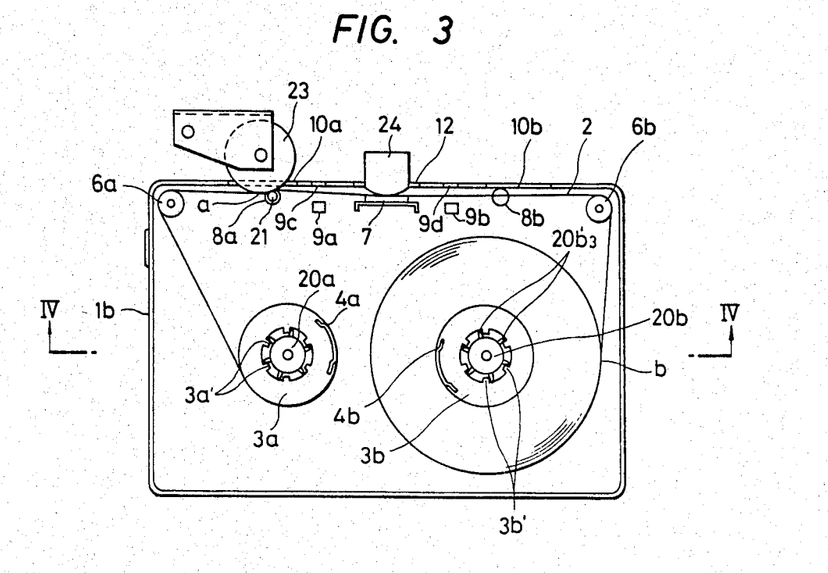
FIG. 3 is a plan view showing a prior art cassette from which an upper half has been removed, together with the essential components of a recorder, as tested for the graphs in FIGS. 1 and 2.
Figure 4:
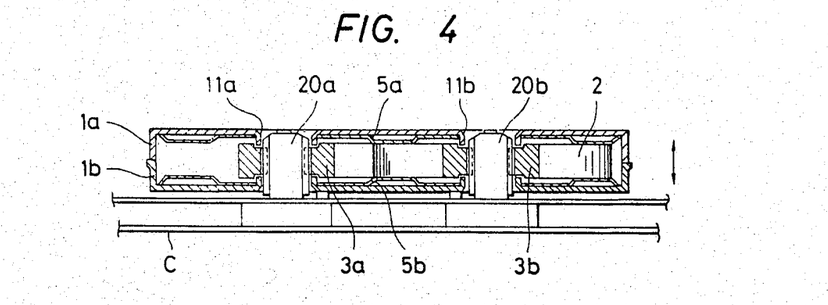
FIG. 4 is a cross sectional view of the cassette tape and recorder taken along line IV—IV of FIG. 3.

Referring first to FIGS. 3 and 4, a tape cassette case generally designated by reference numeral 1 is made up of cassette halves 1a and 1b and a tape 2 encased therein. The tape 2 is fixed at either end to a pair of reels 3a and 3b by means of respective clampers 4a and 4b, so that the tape can be wound onto the reels 3a and 3b. Thus, the when the winding diameter of tape on one side is increased, the winding diameter of tape on the other side is decreased. In the drawings, the tape is fully wound on supply reel 3b. It is a typical feature of the tape cassette that no flanges are provided on the reels 3a and 3b, to thereby decrease the distance between reels 3a and 3b, which in turn leads to a miniaturization of the overall physical cassette size. However, without flange members, the tape may be wound on the reels 3a and 3b non-uniformly in a width wise direction. In order to eliminate this defect, i.e., to prevent the tape from contacting with the inner walls of the cassette halves 1a and 1b, and in order to achieve such prevention without causing any substantial additional friction, a space is provided between the tape and each inner wall of the cassette halves 1a and 1b, and a sheet 5a or 5b which is a so called "retainer" is interposed in this space so that the reels 3a and 3b are retained at a suitable position within the case 1.

A pair of guide rollers 6a and 6b, a pressure pad 7, and the like are encased in the case together with the tape 2 and the reels 3a and 3b. In the walls of the case 1 are formed a pair of capstan shaft insertion holes 8a and 8b, positioning pin insertion holes 9a, 9b, 9c and 9d, a pair of pinch roller insertion holes 10a and 10b, reel shaft insertion holes 11a and 11b, and a magnetic head insertion holes 12. Reference characters 3a' and 3b' denote engagement lips formed at an angular interval of 60° on the circumferential periphery of the reel 3a or 3b.

On the other hand, the cassette tape recorder comprises a pair of reel shafts 20a and 20b, a capstan shaft 21, a pinch roller 23 and a magnetic head 24. When the tape cassette 1 is mounted on the tape recorder, the reel shafts 20a and 20b are inserted through the reel shaft insertion holes 11a and 11b into the interior of the tape cassette 1 and engage with the reels 3a and 3b. At the same time, the capstan shaft 21 is inserted into the capstan shaft insertion hole 8a. Then, when the tape recorder is played, the pinch roller 23 is inserted through the pinch roller insertion hole 10a into the interior of the tape cassette 1 to clamp the tape 2 against the capstan shaft 21 so that the pinch roller cooperates with the capstan shaft 21 rotating at a constant speed to move the tape 2 at a constant speed. At the same time, the magnetic head 24 is inserted through the magnetic head insertion hole 12 into the interior of the cassette case 1 to clamp the tape 2 against the pressure pad 7 to thereby reproduce the information recorded on the tape 2.

In the thus described play condition, the reel shaft 20a serves to take up the tape 2 and is driven by a drive source (not shown), whereas the reel shaft 20b serves to feed the tape 2 and is not driven by the source, but instead the reel shaft 20b is adapted to apply a constant back tension to the tape 2.

Figure 5:
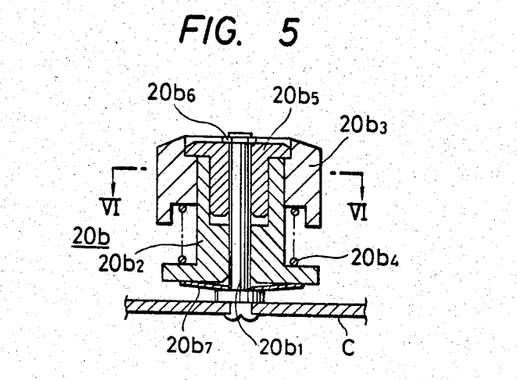
FIG. 5 is a cross sectional view showing a conventional tape supply reel shaft.
Figure 6:
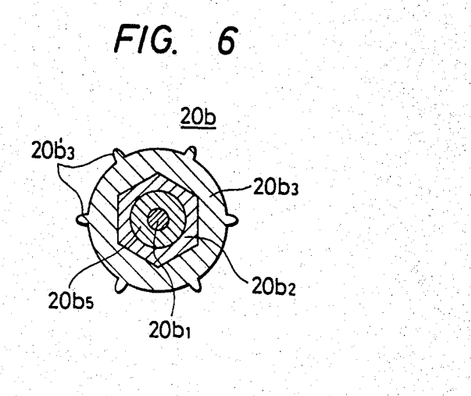
FIG. 6 is a cross sectional view of the reel shaft taken along the line VI—VI of FIG. 5.

The reel shaft 20b on the supply side of conventional construction is shown in FIGS. 5 and 6, wherein the character C denotes a chassis of the cassette tape recorder, from which an upright shaft $20b_1$ extends vertically. A reel shaft member $20b_2$ having a regular hexagonal cross section is freely rotatably mounted on the upright shaft $20b_1$. A cylindrical hub $20b_3$ surrounds the shaft $20b_2$ so as to be slidable in the axial direction but to positively engage with the shaft member $20b_2$ with respect to the horizontal or rotational direction. The cylindrical hub $20b_3$ is biased to move in one direction by a spring $20b_4$ interposed between the bottom surface of the hub and the facing portion of the shaft member $20b_2$. The hub $20b_3$ is held at a position shown by a retaining member $20b_5$ tightly engaged with the shaft member $20b_2$.

Figure 7:
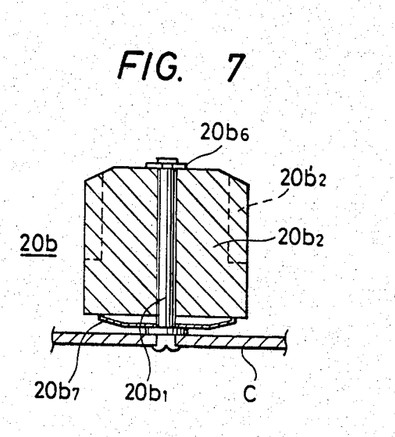
FIG. 7 is a cross sectional view showing another conventional tape supply reel shaft.

As described above, the shaft member $20b_2$, the cylindrical hub $20b_3$, the spring $20b_4$ and the retaining member $20b_5$ are formed in a unit which is prevented from being pulled apart from the upright shaft $20b_1$ by means of a stopping member $20b_6$ mounted on the top end of the upright shaft $20b_1$, as shown in FIG. 5. A leaf spring $20b_7$ interposed between a flanged portion of the upright shaft $20b_1$ and the shaft member $20b_2$ is provided in order to produce a constant frictional force between the reel shaft unit and the upright shaft $20b_1$ to thereby apply a back tension to the tape 2. With the thus constructed reel shaft 20b, when the tape cassette is inserted, if the reel lips 3b' of the cassette are not properly meshed with the outer projections $20b'_3$ of the cylindrical hub $20b_3$, the cylindrical hub $20b_3$ may be pressed downwardly so that no damage occurs. If a simpler construction is desired, as shown in FIG. 7, projections $20b'_2$ may be formed directly on the shaft membmer $20b_2$ with the shaft member rotatably mounted on the upright shaft $20b_1$. The leaf spring $20b_7$ provides back tension and is also provided with somewhat more bending range.

Now, when the above-described tape recorder is in the play condition, let us assume that an up-and-down vibration is applied thereto as shown by the arrow in FIG. 4. When the frequency of vibration is very low, e.g. about 1 Hz, the reels 3a and 3b are vibrated together with the case 1 and chassis C. However, when the frequency is increased, the reels 3a and 3b may remain relatively stationary while only the case 1 vibrates vertically together with the chassis C. For this reason, the upper and lower inner walls of the case 1 collide against the reels 3a and 3b with high energy. In such a condition, the tape 2 may be elongated or shortened between the point a on the tape 2 clamped between the capstan shaft 21 and the pinch roller 23 and the point b at the winding end of the reel 3b.

It is to be noted that the tape 2 between the above described points a and b has a resonance at a resonance frequency $f_0$ which is determined according to the spring constant of the tape 2 and the inertial moment of the tape wound on the reel 3b. Now, when the value of $f_0$ is calculated with a typical back tension of 2 to 3 g, a value of $f_0 = 30-40$ Hz, is derived.

Figures 8A, 8D:
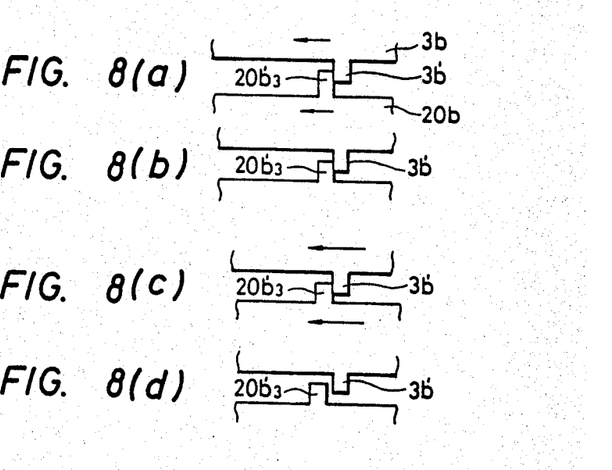

When the cassette tape recorder is in its play condition, as shown in FIG. 8a, the projections $3b'$ of the supply reel 3b are engaged with the projections $20b'_3$ of the reel shaft 20b so that the projections $3b'$ rotate the reel shaft 20b while the supply reel is rotated in the direction of the arrow. However, when the above noted resonance is generated, the rotation of the reel 3b may be stopped by the elongation of the tape 2 as shown in FIG. 8b. Thereafter, due to the reduction of the tape, the reel 3b is rapidly rotated to thereby rotate the reel shaft 20b with high energy and at a higher speed as shown in FIG. 8c. For this reason, a reactive force occurs whereby the shaft projections $20b'_3$ push back on the reel projections $3b'$ so that, with the next elongation of the tape 2, the projections $3b'$ and $20b'_3$ of both members are separated from each other as shown in FIG. 8d. Once such a state is generated, collision and reaction are alternately generated between the projections $3b'$ and $20b'_3$ to thereby cause a so-called jitter. As a result, the travelling speed of the tape 2 on the surface of the magnetic head 24 is changed, which causes wow to be generated at about 40 Hz.

SUMMARY OF THE INVENTION

Accordingly, it is an object of this invention to provide a cassettte tape machine having a shaft unit substantially immune to tape resonance caused by vertical vibration.

Briefly, this is achieved according to the present invention by providing a resilient contact between the shaft unit and the reel of the cassette. In one embodiment, the hub is made of a resilient material but is covered by a hard plastic retaining member which exposes only the resilient projections of the hub. In another embodiment, the hub is of a harder material but at least the surface of the hub projections which contact the reel during supply direction rotation are formed of a resilient material. In a third embodiment, the hub is radially expandable and contractable so that the projections may retract slightly on impact.

BRIEF DESCRIPTION OF THE DRAWINGS

In the drawings:

FIGS. 8a to 8d illustrate a resonance problem caused in the conventional tape supply reel shafts;

DETAILED DESCRIPTION OF THE INVENTION

Figure 9:
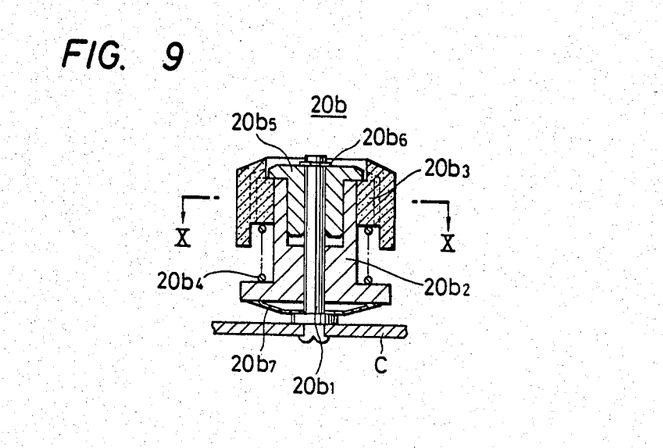
FIG. 9 is a cross sectional view showing a reel shaft unit on the tape supply side, used with a cassette tape recorder according to this invention.
Figure 10:
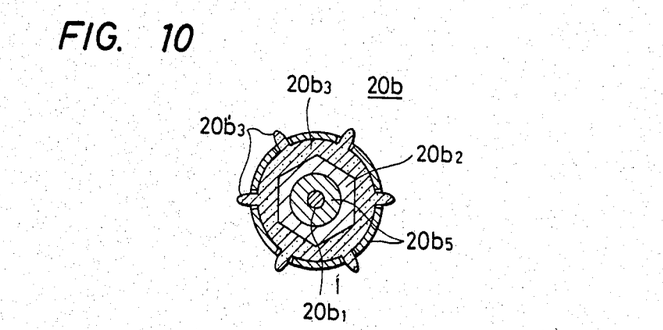
FIG. 10 is a cross sectional view of the reel shaft unit taken along the line X—X of FIG. 9.
Figure 11:
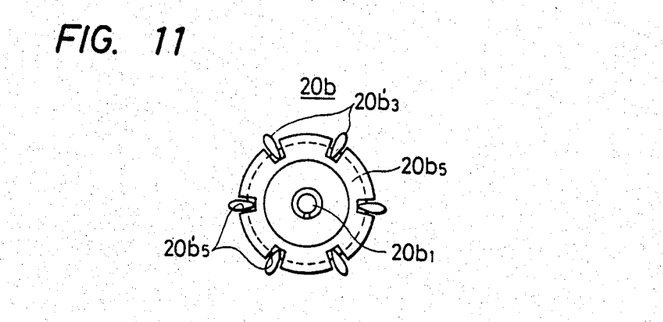
FIG. 11 is a plan view of the reel shaft shown in FIGS. 9 and 10.
Figure 12:
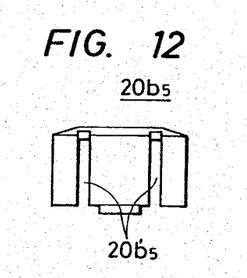
FIG. 12 is a side view of one component shown in FIG. 9.

FIGS. 9 to 11 show a reel shaft unit 20b on the tape supply side of a one way type cassette tape recorder. In these figures, a cylindrical hub $20b_3$ is made of chloroprene rubber, butyl rubber or similar elastic material. On the outer periphery of the cylindrical hub are formed projections $20b'_3$ which may engage with engagement projections $3b'$ of a cassette reel 3b. As shown in FIG. 12, and in dotted outline in FIG. 9, a retaining member $20b_5$ has a flanged part on its upper portion and a hollow space therein. The flanged part of the retaining member $20b_5$ is provided with slits $20b'_5$ at positions corresponding to the projections $20b'_3$ of the cylindrical hub $20b_3$. The projections $20b'_3$ are formed to project radially outwardly through the slits $20b'_5$. In other words, the cylindrical hub $20b'_3$ is covered by the hard plastic of the retaining member $20b_5$ over its outer periphery except for the projections $20b'_3$. This structure may facilitate attachment or detachment of the cassette while the engagement projections $3b'$ of the reel 3b of the cassette are smoothly engaged with the projections $20b'_3$ of the reel shaft unit $20b$.

Figure 13:
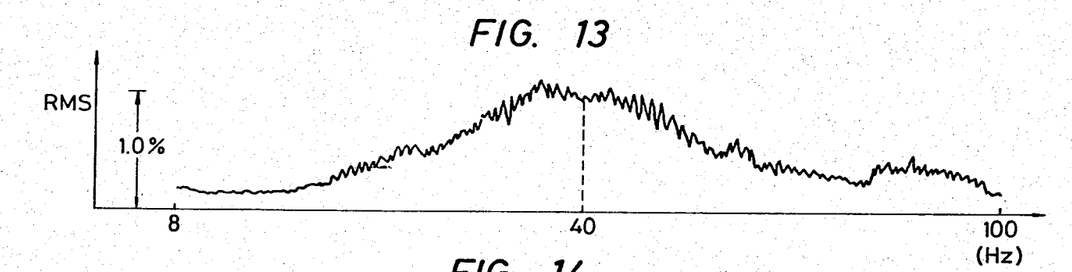
FIGS. 13 and 14 are graphs showing the wow characteristics of the unit shown in FIG. 9 and measured before and after the auditory compensation.
Figure 14:
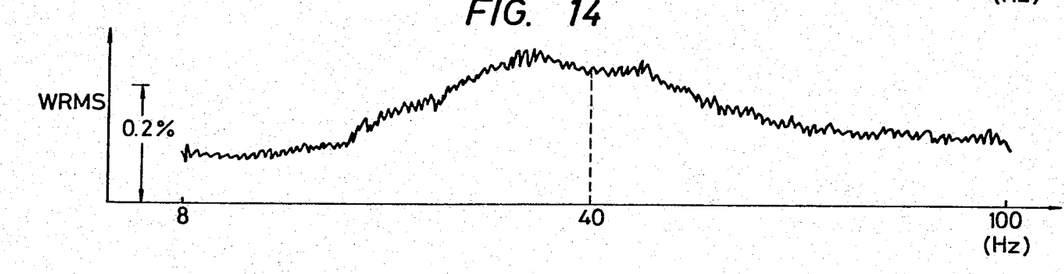

With such a construction for the reel shaft unit $20b$, even if the engagement projections $3b'$ of the reel $3b$ are collided against the projections $20b'_3$ of the reel shaft unit $20b$, the collision therebetween is damped by the deformation of the projections $20b'_3$ made of viscous elastic material. Accordingly, only a weak repulsive force is generated therebetween, and the separation as shown in FIG. 8d may be prevented, which leads to a decrease of resonance in the tape 2. FIGS. 13 and 14 show the wow characteristics measured for a cassette deck employing the shaft unit according to the embodiment of the invention shown in FIGS. 9 to 12. Wow is eliminated above 1% and 0.2% before and after the auditory compensation.

Figure 15:
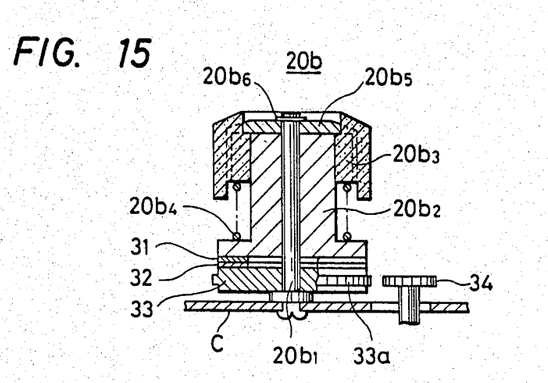
FIGS. 15 to 18 are cross sectional views of various modifications of the present invention.
Figure 16:
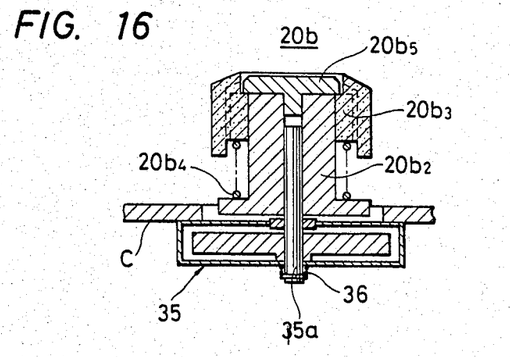

FIGS. 15 and 16 show a reel shaft unit $20b$ used with a bidirectional cassette tape recorder in which the tape reel shaft may be used not only as a tape supply reel but also as a tape take-up reel, thereby requiring additional components or members. More specifically, in FIG. 15, a pulley 33 is provided together with the reel shaft unit $20b$, the pulley being coupled to the shaft body $20b_2$ through a friction mechanism composed of felts 31 and 32 pressingly engaged with each other by a spring $20b_4$. The pulley 33 is provided on its outer periphery with a gear $33a$ which may selectively engage a gear 34 rotated by a drive source (not shown).

In the embodiment shown in FIG. 16, a flat motor which is operative when the reel shaft unit $20b$ is used as a take-up reel is fixed to the chassis C. The reel shaft unit is fixed to a rotary shaft $35a$ of the motor 35. In this case, when the reel shaft unit $20b$ is used as a tape supply reel, the motor is not operative. A spring 36 mounted at the end of the rotary shaft is used for the purpose of application of back tension to the tape 2.

Figure 17:
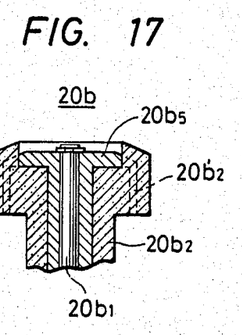

In the embodiments described above, the cylindrical hub $20b_3$ is freely slidable along the axis of the shaft member $20b_2$. However, this feature is not necessary and, as shown in FIG. 17, the shaft member $20b_2$ itself may be made of viscous elastic material and projections $20b'_2$ formed integrally with the shaft member $20b_2$. The projections $20b'_2$ are engaged with the engagement projections $3b'$ of the reel $3b$. Also, in order that the upright shaft $20b_1$ is not in direct contact with a shaft member $20b_2$, a central tubular portion of the retaining member $20b_5$ may be pressingly inserted into the center hole of the shaft member $20b_2$.

Figure 18:
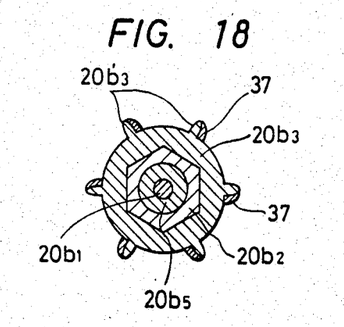

FIG. 18 shows another embodiment according to the present invention, in which instead of the formation of the entire cylindrical hub of viscous elastic material, viscous elastic members 37 are attached to the contact surfaces of the projections $20b'_3$ of the cylindrical hub $20b_3$ against which the projections $3b'$ of the reel will engage during supply direction rotation so that the engagement portions between the projections of the cylindrical hub and the cassette reel have viscous elasticity.

Figure 19:
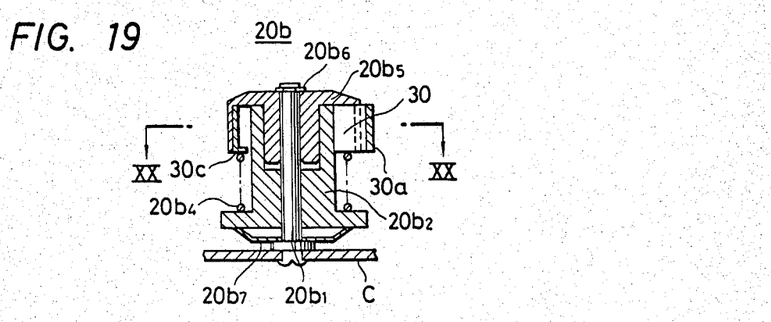
FIG. 19 is a cross sectional view of another reel shaft unit according to the present invention.
Figure 20:
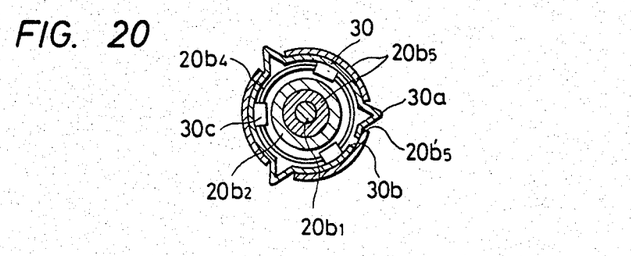
FIG. 20 is a cross sectional view of the unit taken along the line XX—XX of FIG. 19.
Figure 21:
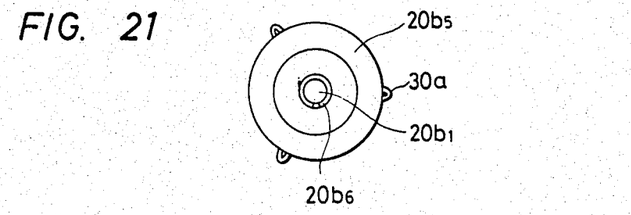
FIG. 21 is a plan view of the reel shaft unit shown in FIG. 19.
Figure 22:
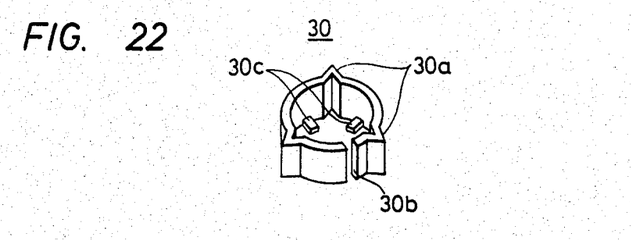
FIG. 22 is a perspective view of component shown in FIG. 9.

FIGS. 19 to 21 show another embodiment of a reel shaft unit $20b$ for a cassette one-way type tape recorder. In these figures, a ring-shaped member 30, instead of the cylindrical hub $20b_3$ shown in FIGS. 5 and 6, is mounted on the outer periphery of a shaft member $20b_2$. As shown in FIG. 22, projections $30a$ having triangular cross sections are molded of plastic integrally with the member 30 at, e.g. 120° intervals. In the member 30, slit $30b$ is formed in order to impart flexibility in the radial direction. The ring-shaped member 30 expands to engage with an inner surface of a retaining member $20b_5$ which is formed in a cup-shape and has an outer periphery which extends downwardly. The projections $30a$ protrude radially outwardly through slits $20b'_5$ of the retaining member $20b_5$ so that the ring-shaped member 30 can be held without rotational displacement. In the ring-shaped member 30 are formed lips $30c$ which receive a spring $20_4$ as shown.

Figure 23:
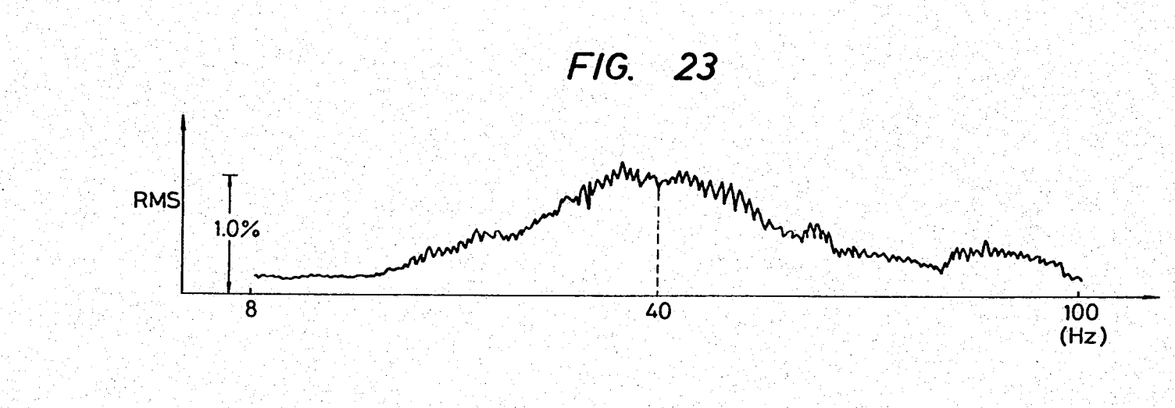
FIGS. 23 and 24 are graphs showing the wow characteristics of the unit shown in FIG. 19.
Figure 24:
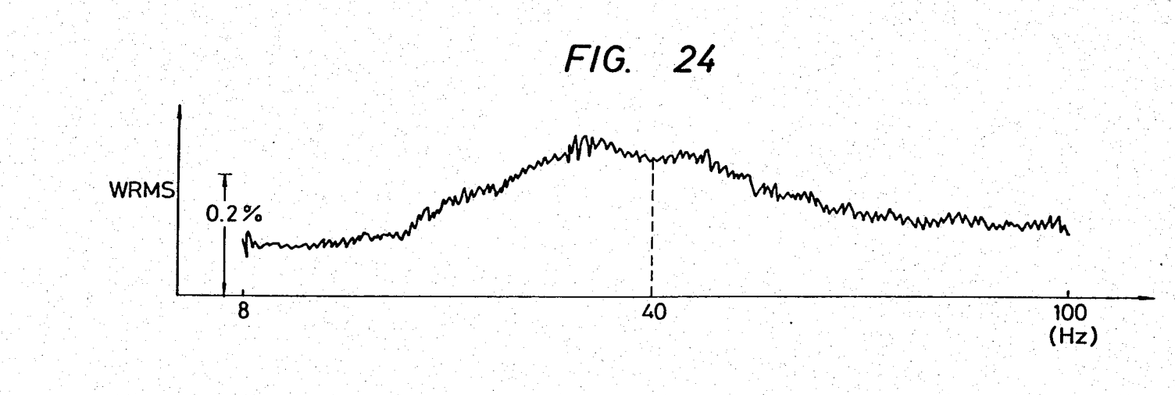

When the thus constructed reel shaft unit $20b$ is used, the collision generated when the projections $3b'$ of the cassette reel $3b$ are in abutment with the projections $30a$ of the ring-shaped member 30 is damped due to the radial deformation of the ring-shaped member 30. As a result, the reaction force between the reel $3b$ and the reel shaft $20b$ is weak, and the separation shown in FIG. 8d can be prevented. This leads to generation of only a small resonance in the tape. As is apparent from the characteristics shown in FIGS. 23 and 24, wow is eliminated above 1% and 0.2% before and after the auditory compensation, respectively.

Figure 25:
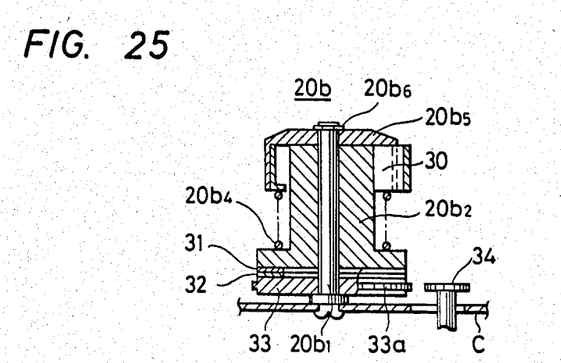
FIGS. 25 to 27 show other modifications of the unit according to the embodiment of FIG. 19.
Figure 26:
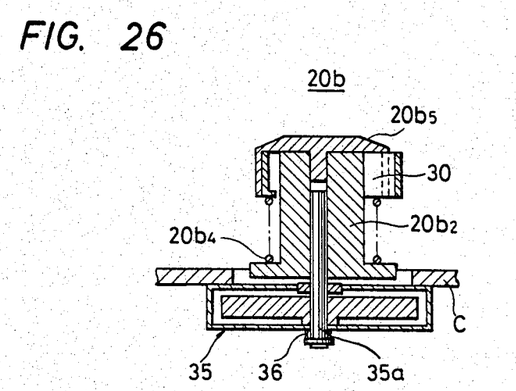

FIGS. 25 and 26 show other reel shaft units $20b$ used with a bidirectional tape recorder, in which the reel shaft units are used as both tape feeding reels and tape take-up reels, thereby requiring additional structure. More specifically, in the embodiment shown in FIG. 25, a pulley 33 is coupled to a shaft member $20b_2$ through a friction mechanism composed of felts 31 and 32 contacting pressingly with each other by means of the spring $20b_4$. An outer gear $33a$ of the pulley 33 is selectively engaged with a gear rotated by a drive source (not shown).

In FIG. 21, a flat motor 35 rotated when the reel shaft unit $20b$ is used as a tape take up reel is fixed to the chassis C, and the reel shaft unit is fixed to the rotary shaft $35a$ of the motor 35. A spring 36 mounted at the lower end of the rotary shaft $35a$ is used for preventing the vertical vibration of the rotary shaft $35a$ and for applying back tension to the tape 2.

Figure 27:
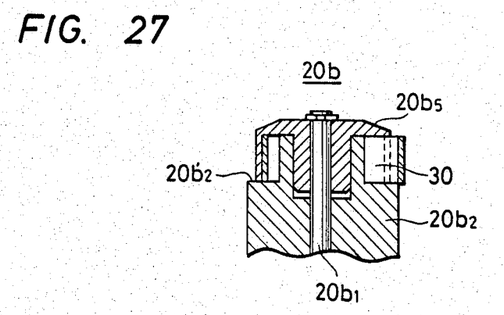

In the reel shaft units shown in FIGS. 19, 25 and 26, the ring shaped member 30 is slidable in the axial direction of the reel shaft $20b$, which feature is not necessary to achieve the essential purpose of the present invention. Therefore, in FIG. 27, a shouldered portion $20b'_2$ may be formed on the shaft member $20b_2$ and the ring-shaped member 30 may be clamped between the shouldered portion $20b'_2$ and the retaining member $20b_5$. In this case, since the lips $30c$ for receiving the spring $20b_4$ are not required for the ring-shaped member 30, the members can be made not of plastic but instead of a resilient material such as a ribbon-shaped spring.

What is claimed is:

1. In a cassette tape machine having a rotatable reel shaft unit with a plurality of engagement projections on its outer periphery having contact surfaces for engaging a reel in a cassette tape whereby said reel rotates said shaft unit in a supply direction, the improvement characterized in that said shaft unit comprises:

a shaft member;

a ring-shaped member disposed around said shaft member and axially movable with respect to said shaft member, said ring-shaped member being biased for radial expansion and including said plurality of engagement projections, said engagement projections having resiliently inclined contact surfaces whereby abutment of said contact surfaces by said reel will urge said projections radially inwardly with respect to said shaft unit; and a retaining member for limiting radial expansion of said ring-shaped member and having a plurality of slits through which said engagement projections contact said reel.

2. A cassette tape machine as claimed in claim 1, wherein said ring-shaped member further includes at least one flange portion extending radially inwardly, said shaft unit further comprising a spring member abutting said flange portion to urge said ring-shaped member axially with respect to said shaft member.

* * * * *